United States Patent [19]

Viscardi

[11] 4,211,027
[45] Jul. 8, 1980

[54] ELONGATED FLEXIBLE FISHING LURE WITH HELICAL SHAPE

[76] Inventor: Francis N. Viscardi, 6109 Wheatland Rd., Baltimore, Md. 21228

[21] Appl. No.: 950,408

[22] Filed: Oct. 11, 1978

[51] Int. Cl.³ ............................................. A01K 85/00
[52] U.S. Cl. ..................................... 43/42.24; 43/42.1
[58] Field of Search ................................ 43/42.24, 42.1

[56] References Cited

U.S. PATENT DOCUMENTS

| | | | |
|---|---|---|---|
| 559,293 | 4/1896 | Kitchen | 43/42.24 |
| 596,385 | 12/1897 | Simon | 43/42.24 |
| 675,321 | 5/1901 | Brownfield | 43/42.24 |
| 1,561,512 | 11/1925 | Fredricks | 43/42.24 |
| 1,644,151 | 10/1927 | Rodgers | 43/42.24 |
| 3,012,356 | 12/1961 | Tyson | 43/42.24 |
| 3,031,791 | 5/1962 | Banks | 43/42.24 |
| 3,120,074 | 2/1964 | Messler | 43/42.24 |
| 3,965,606 | 6/1976 | Bingler | 43/42.24 |

FOREIGN PATENT DOCUMENTS

| | | | |
|---|---|---|---|
| 2511860 | 10/1976 | Fed. Rep. of Germany | 43/42.1 |
| 85156 | 5/1965 | France | 43/42.24 |
| 1493780 | 7/1967 | France | 43/42.24 |
| 117888 | 10/1969 | Norway | 43/42.24 |
| 19111 | of 1901 | United Kingdom | 43/42.1 |
| 3631 | of 1905 | United Kingdom | 43/42.24 |

*Primary Examiner*—Othell M. Simpson
*Assistant Examiner*—J. T. Zatarga
*Attorney, Agent, or Firm*—Lane, Aitken & Ziems

[57] ABSTRACT

A fishing lure includes a hook, a swivel, a line portion connected between the hook and swivel and a length of flexible tubing at least 7" long around the line portion and portion of the hook connected to the line portion. The hook includes a barbed end projecting from the tubing, the tubing being cut to form an elongated helix with essentially no space between adjacent coils of the helix. A camouflage such as feathers project from the hook end of the tubing.

4 Claims, 1 Drawing Figure

U.S. Patent
Jul. 8, 1980
4,211,027
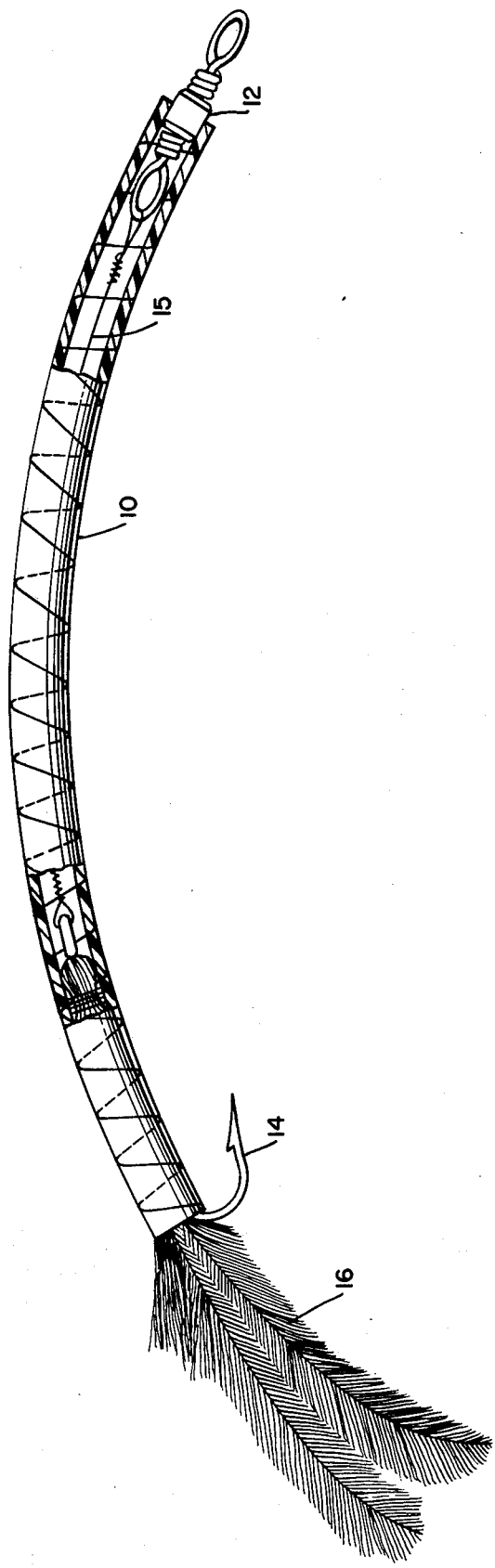

ELONGATED FLEXIBLE FISHING LURE WITH HELICAL SHAPE

BACKGROUND OF THE INVENTION

This invention relates generally to fishing lures and, in particular, to a fishing lure which attracts fish by simulating the characteristics of an eel swimming through water.

Many fishing lures have been designed to stimulate natural food sources of fish. One example is the use of surgical tubing which gives the appearance of an eel swimming through the water, which attracts fish such as bluefish. However, the exact movement and appearance of an eel has been found to be difficult to duplicate.

SUMMARY OF THE INVENTION

This invention relates to a fishing lure which, it is believed, more closely resembles an eel than any other type of heretofore known fishing lure.

The invention is directed to a fishing lure which includes a length of flexible tubing which, when pulled through the water, gives the appearance of an eel swimming. However, the tubing is cut to form an elongated helix or coil with essentially no space between adjacent portions of the coils. The helical piece of flexible tubing is formed around a line portion formed prefereably of a strong material such as metallic wire and connected between a swivel at one end and a hook at the other end. The flexible tubing covers a portion of the hook with the end projecting from the end of the tubing. Usually a camouflage device such as feathers projects from the hook end of the tubing so that the hook is not readily apparent to the fish.

When the lure is used, it is bent or curved slightly along its entire length so that when the lure is pulled through the water the lure will wiggle back and forth. This wiggling has been found to closely simulate the movement of an eel and, in fact, when the lure is being pulled close to the water surface, water moving through the portions of the helix forms a froth or wake of bubbles which it is believed also attract fish. It is believed that by forming the length of flexible tubing in the shape of a helix more closely simulates the appearance and characteristics of a moving eel than the use of a solid flexible tubing as done in the prior art.

BRIEF DESCRIPTION OF THE DRAWINGS

For a better understanding of the invention, reference may be had to the following description of a preferred embodiment of the invention taken in conjunction with the accompanying drawing, in which:

FIG. 1 is a perspective view, partially in cross-section, of the fishing lure which is the subject of the instant invention.

DETAILED DESCRIPTION OF A PREFERRED EMBODIMENT

Referring to FIG. 1, the invention will be described in detail. Reference numeral 10 is used to identify a length of flexible tubing which, it should be noted, is cut to form an elongated helix or coil with essentially no space between adjacent coils. A swivel connection 12 projects from one end of the tubing for connection to a standard fishing line (not shown) where the lure can rotate relative to the line. A hook 14 projects from the other end of the flexible tubing 10. A line portion 15 formed of a strong material such as metallic wire is connected between the swivel and hook. A camouflage means such as feathers 16 project from the hook end of the tubing in order to camouflage the hook 14.

It has been found that the tubing should be at least seven inches long so that movement of the lure through the water will closely simulate the movement and appearance of an eel. When in use, the flexible tubing 10 should be bent or curved slightly along its entire length which causes the lure 10 to wiggle as it moves through the water. The action of the water flowing through adjacent portions or coils of the helix will cause the lure to wiggle and closely simulate the movement of an eel and cause bubbles to form which, it is believed, provides an extra attraction to fish such as bluefish.

The flexible tubing 10 can be formed of many different colors such as green, red, black or the like, but the color forms no part of the invention.

The tubing can be formed of rubber surgical hose or any suitable type of plastic flexible tubing. The tubing is taken and then cut to form the helix as shown in FIG. 1.

Therefore, in accordance with the invention, a fishing lure has been described which it is believed provides a closer visual and operational similarity to the natural food of fish such as bluefish than that provided by any other type of known fishing lures.

I claim:

1. A fishing lure comprising:
    an elongated flexible helix of resilient material having substantially no space between adjacent coils of the helix and defining an elongated tube at least 7" long curved along its entire length;
    a swivel connector projecting from one end of the tube for connection to a fishing line;
    a hook projecting from the other end of the tube, the hook including a barbed end;
    a metallic wire extending within the tube for a substantial portion of the length of the tube and connecting the swivel connector to the hook; and
    camouflage means also projecting from said other end of the tube.
2. The lure of claim 1, wherein the camouflage means includes feathers.
3. The lure of claim 1, wherein the flexible tubing is formed of rubber.
4. The lure of claim 1, wherein the flexible tubing is formed of plastic.

* * * * *